(12) United States Patent
Ermilios et al.

(10) Patent No.: US 10,839,231 B2
(45) Date of Patent: Nov. 17, 2020

(54) METHOD FOR DETECTING A ROLLING SHUTTER EFFECT IN IMAGES OF AN ENVIRONMENTAL REGION OF A MOTOR VEHICLE, COMPUTING DEVICE, DRIVER ASSISTANCE SYSTEM AS WELL AS MOTOR VEHICLE

(71) Applicant: Connaught Electronics Ltd., Tuam (IE)

(72) Inventors: Pantelis Ermilios, Tuam (IE); Bryan Mcnamara, Tuam (IE); William O'Grady, Tuam (IE); Myles Friel, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 176 days.

(21) Appl. No.: 16/084,530

(22) PCT Filed: Mar. 13, 2017

(86) PCT No.: PCT/EP2017/055786
§ 371 (c)(1),
(2) Date: Sep. 12, 2018

(87) PCT Pub. No.: WO2017/157826
PCT Pub. Date: Sep. 21, 2017

(65) Prior Publication Data
US 2019/0080181 A1    Mar. 14, 2019

(30) Foreign Application Priority Data
Mar. 15, 2016    (DE) ........................ 10 2016 104 731

(51) Int. Cl.
*G06K 9/00* (2006.01)
*G06T 7/80* (2017.01)
*B60R 1/00* (2006.01)

(52) U.S. Cl.
CPC ............ *G06K 9/00798* (2013.01); *B60R 1/00* (2013.01); *G06K 9/00791* (2013.01); *G06T 7/80* (2017.01)

(58) Field of Classification Search
CPC .. B60R 1/00; G06K 9/00791; G06K 9/00798; G06T 7/80
See application file for complete search history.

(56) References Cited

U.S. PATENT DOCUMENTS

2011/0267514 A1*  11/2011  D'Angelo ............ H04N 5/2329
                                                              348/296
2015/0237479 A1*   8/2015  Fung ..................... H04W 4/026
                                                              455/456.6
2015/0332114 A1*  11/2015  Springer ................ G08G 1/166
                                                              348/148

FOREIGN PATENT DOCUMENTS

DE    102010062297 A1    6/2012
EP         2665037 A1   11/2013
WO      2010/038224 A1    4/2010

OTHER PUBLICATIONS

International Search Report issued in PCT/EP2017/055786 dated May 30, 2017 (3 pages).

(Continued)

*Primary Examiner* — Xin Jia
(74) *Attorney, Agent, or Firm* — Osha Bergman Watanabe & Burton LLP

(57) ABSTRACT

The invention relates to a method for detecting a rolling shutter effect in images of an environmental region (9) of a motor vehicle (1) captured by an image sensor of at least one camera (4) of the motor vehicle (1) comprising a plurality of sensor lines (15), including the following steps: a) determining a first position (P1) on a sensor plane (13) of the image sensor corresponding to a feature (14) when capturing a first image and identifying a second position (P2) on the (Continued)

Figure 1:
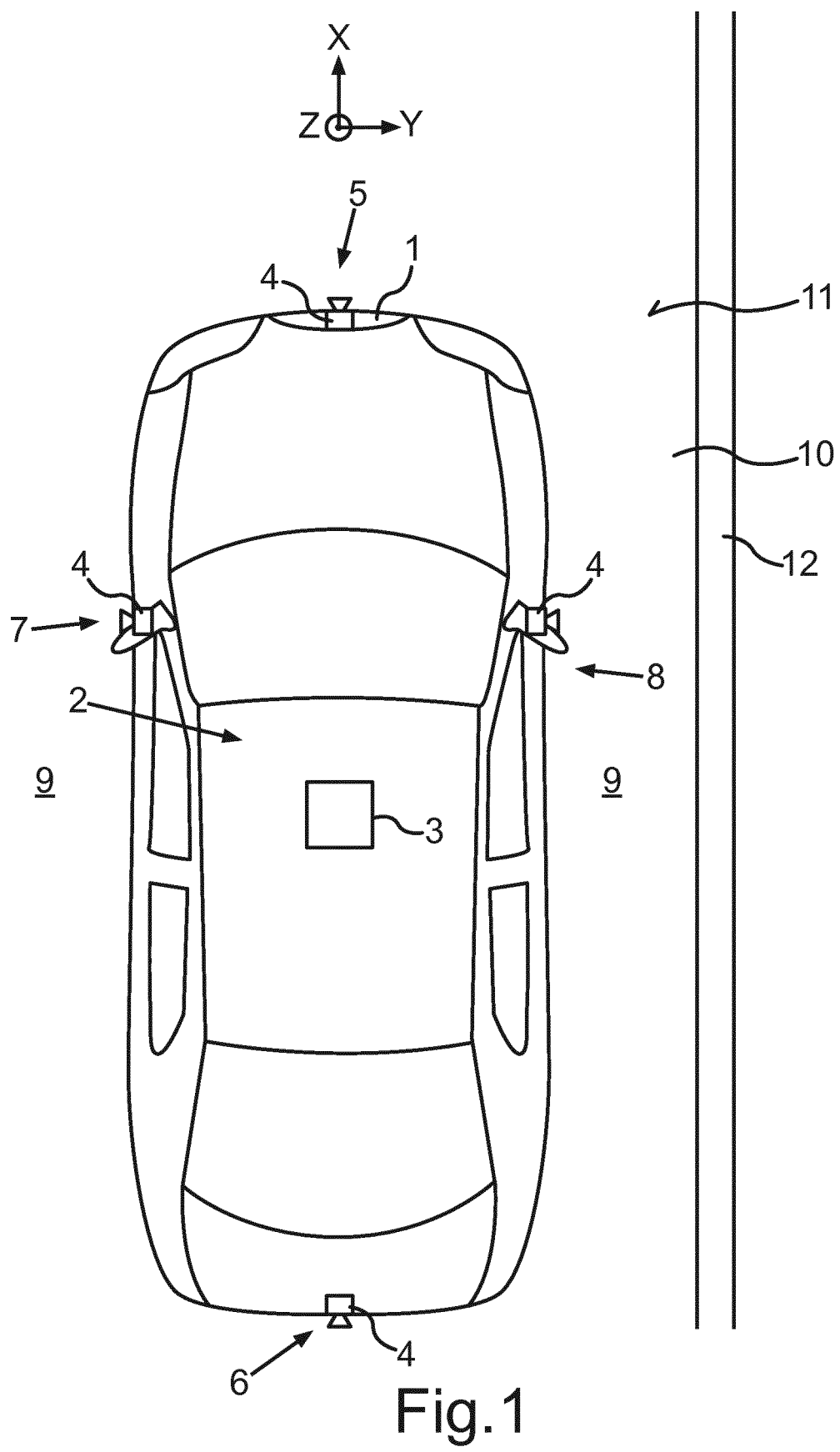

sensor plane (13) corresponding to the feature (14) when capturing a second image, b) determining a motion vector (v) characterizing a displacement of the feature (14) on the sensor plane (13) between the first position (P1) and the second position (P2), c) determining a vertical span (Δy) of the motion vector (v) characterizing a number of sensor lines (15) at least partially covered by the motion vector (v), d) detecting the rolling shutter effect based on the vertical span (Δy). I addition, the invention relates to a computing device (3), a driver assistance system (2) as well as a motor vehicle (1).

7 Claims, 2 Drawing Sheets

(56) References Cited

OTHER PUBLICATIONS

Written Opinion of the International Searching Authority issued in PCT/EP2017/055786 dated May 30, 2017 (6 pages).
German Search Report issued in DE 10 2016 104 731.7 dated Nov. 10, 2016 (9 pages).

\* cited by examiner

METHOD FOR DETECTING A ROLLING SHUTTER EFFECT IN IMAGES OF AN ENVIRONMENTAL REGION OF A MOTOR VEHICLE, COMPUTING DEVICE, DRIVER ASSISTANCE SYSTEM AS WELL AS MOTOR VEHICLE

The invention relates to a method for detecting a rolling shutter effect in images of an environmental region of a motor vehicle captured by an image sensor of at least one camera of the motor vehicle. In addition, the invention relates to a computing device, to a driver assistance system as well as to a motor vehicle with a driver assistance system.

Presently, the interest focuses on cameras for motor vehicles. The cameras are adapted to capture an environmental region of the motor vehicle in images or video frames. Information extracted from the images can be provided to a driver assistance system of the motor vehicle. Such automotive cameras comprising a CMOS sensor, so-called CMOS cameras, typically use a rolling shutter method to capture each image. This means that each line in the image is exposed at a later time than the previous lines. As the vehicle moves, the same point-like feature captured at a particular line or scan line in one frame may be captured at a different scan line in the next frame due to perspective distortion, i.e. if the sensor plane is not parallel to the ground plane or aligned with the longitudinal axis of the vehicle. In other words, not all parts of the image of the scene are recorded at exactly the same instant. This might result in a so-called rolling shutter effect, which is visible in the images as a distorted depiction of the environmental area.

It is the object of the present invention to provide a solution how high-quality images of an environmental region of a motor vehicle can be captured.

According to the invention, this object is solved by a method, a computing device, a driver assistance system as well as a motor vehicle comprising the features according to the respective independent claims. Advantageous embodiments of the invention are the subject matter of the dependent claims, of the description, and of the figures.

In an embodiment of the invention a method is provided which serves for detecting a rolling shutter effect in images of an environmental region of a motor vehicle captured by an image sensor of at least one camera of the motor vehicle comprising a plurality of sensor lines. In particular, a first position on a sensor plane of the image sensor corresponding to a feature when capturing a first image is determined, a second position on the sensor plane corresponding to the feature when capturing a second image is identified and a motion vector characterizing a displacement of the feature on the sensor plane between the first position and the second position is determined. In particular, a vertical span of the motion vector characterizing a number of sensor lines at least partially covered by the motion vector is determined and the rolling shutter effect based on the vertical span is detected.

In a preferred embodiment of the invention a method is provided which serves for detecting a rolling shutter effect in images of an environmental region of a motor vehicle captured by an image sensor of at least one camera of the motor vehicle comprising a plurality of sensor lines. Therefore, a first position on a sensor plane of the image sensor corresponding to a feature when capturing a first image is determined, a second position on the sensor plane corresponding to the feature when capturing a second image is identified and a motion vector characterizing a displacement of the feature on the sensor plane between the first position and the second position is determined. Moreover, a vertical span of the motion vector characterizing a number of sensor lines at least partially covered by the motion vector is determined and the rolling shutter effect based on the vertical span is detected.

By means of the method which can be performed by a vehicle-side computing device high quality images or pictures can be captured by the at least one vehicle-side camera. The vehicle can comprise four cameras that can form a surround view camera system, wherein a first camera can be disposed in a front area of the motor vehicle, a second camera can be disposed in a rear area of the motor vehicle, a third camera can be disposed on a driver's side of the motor vehicle, in particular on a driver's side wing mirror, and a fourth camera can be disposed on a passenger's side of the motor vehicle, in particular on a passenger's side wing mirror. The cameras can comprise fisheye lenses in order to enlarge an angle of view and thus a detection range of the cameras. The camera comprises the image sensor which can be configured as a CMOS sensor with sensor elements or pixels arranged in rows and columns. All pixels of the sensor arranged in one row form one sensor line or scan line. The pixels of the sensor correspond to pixels of the image. That means that a sensor signal generated by one sensor element is transferred to a colour signal to be output by one pixel of the image.

A feature, e.g. corresponding to an object in the environmental region of the motor vehicle, can be identified in two images or image frames of a video sequence consecutively captured by the image sensor. The first position of the feature on the plane of the image sensor is determined which also refers to a first position of the feature in the first picture. Then, the second position of the feature on the plane of the image sensor is determined which also refers to a second position of the feature in the second picture. The motion vector having the first position as a starting point and the second position as an end point is determined, wherein the motion vector describes a trajectory of the feature between a first recording time and a second recording time.

Then, the vertical span of the motion vector is determined. The vertical span describes a number of sensor lines, across which the motion vector extends. In other words, a span between the starting point and the end point, or rather an offset between the starting position and the end position, is determined. For instance, if the end point is lower than the starting point, or rather if the row of the end point lies below the row of the starting point, then additional time has elapsed in comparison to a nominal frame period. If the end point is higher than the starting point, or rather if the row of the end point lies above the row of the starting point, then less time has elapsed in comparison to the nominal frame period. These offsets can affect a true projected length of the motion vectors on a ground plane and cause error in a camera calibration when not taken into account. Thus, the rolling shutter effect can be recognized based on the vertical span of a motion vector in a very easy way.

Particularly preferably, a correction factor for compensating the rolling shutter effect is determined dependent on the vertical span of the motion vector. In particular, the correction factor is determined dependent on a total number of sensor lines wherein the total number of sensor lines comprises a number of active sensor lines and a number of vertical blanking lines. Therein, the number of active lines is the number of lines containing image data. The number of vertical blanking lines is used for internal delay. The correction factor is determined for each motion vector describing the displacement of a certain feature between two frames consecutively captured. This correction factor can be applied in order to compensate for the rolling shutter effect. By means of this factor, high-quality and distortion-free images can be provided and displayed on a vehicle-side display device.

In a further embodiment of the invention, an extrinsic calibration of the camera is performed based on the motion vector and on the correction factor. In this embodiment a method is provided which serves for extrinsic calibration of the camera based on at least two images consecutively captured by the camera. Therein, the images at least partially display a texture of a road surface. The extrinsic calibration method or motion tracking calibration (MTC) operation serves for online calibration of the camera by analysing a sequence of the at least two images captured by the camera while the vehicle is moving particularly in an approximately straight path. In other words the purpose is to determine and calibrate at least one extrinsic parameter of the camera during movement of the motor vehicle by means of the time sequence comprising at least one pair of images. For example, the extrinsic parameters can comprise a spatial orientation of the camera relative to the road surface or ground plane and a height of the camera relative to the ground or relative to another camera of the vehicle. The method can be performed by the computing device.

The images at least partially show the road surface or ground surface in a vicinity of the motor vehicle as well as the texture being present on the surface such as tarmac. In particular, the calibration step according to this embodiment does not require any particular features of interest such as corners, contours, edges or lines to be present on the image. At least one calibration cycle can be performed resulting in a single calibration result, wherein the rolling shutter effect is removed during camera calibration. The advantage of compensating the rolling shutter effect is that a reliable and correct calibration can be performed since the rolling shutter can introduce significant error in the calibration.

Preferably, for performing the extrinsic calibration, a rotation calibration of the camera is performed, wherein a cost function describing a deviation between the motion vector and a predetermined vector is determined in dependency on the correction factor and a rotation-compensated motion vector is determined by minimizing the cost function. In other words this means that the rotation calibration is performed by finding the 3-DOF (degree of freedom) spatial orientation of the camera relative to the ground plane by analysing the motion vector. The orientation of the camera is a first extrinsic parameter to be calibrated. The orientation can for example be expressed in a roll-pitch-yaw rotation scheme rotating in sequence about the fixed X-, Y- and Z-axes of the world coordinate system, where the X-axis is orientated along a longitudinal vehicle axis, the Y-axis is orientated along a transverse vehicle axis and the Z-axis is orientated along a vertical vehicle axis.

For performing the rotation calibration, a so-called block matching operation can be performed based on two images consecutively captured by the camera in order to find corresponding blocks within the images. Corresponding blocks is understood to be image areas of two images or video frames which at least partially display the same environmental region, or rather the same features.

After identifying the mutually corresponding blocks in the at least two images, a block motion vector or block displacement vector can be determined for each pair of mutually corresponding blocks. The block motion vector of two mutually corresponding blocks comprising a certain feature can be identical to the motion vector of this feature used for detecting the rolling shutter effect. Then the cost function or loss function to be minimised is formulated that particularly exploits geometric properties of the motion vectors on the road surface or ground plane, and, in particular, the constraint for approximately straight driving. The cost function is determined in dependency on the correction factor.

The invention is based on the fact that a calibrated system should produce motion vectors free from perspective distortion, i.e. motion vectors that are all parallel to the horizontal x-axis (in the image frame), or parallel to the longitudinal vehicle axis in case of the motion vector projected onto the ground surface, and of equal length, while driving straight on a flat ground. Thus, the predetermined vector is the distortion-free vector parallel to the horizontal or longitudinal axis. This objective can be expressed by the sum of squares of the y-components and the variance of the x-components of all motion vectors. For a calibrated camera in ideal conditions this would be zero. Therefore, the cost function indicates the difference between the present, real condition and the ideal condition. Thus, by finding the cost function, a present camera orientation deviating from the default camera orientation can easily be determined as the first extrinsic parameter of the camera. By minimizing the cost function, a rotation-compensated motion vector can be derived. The rotation-compensated motion vectors relating to a plurality of features within the images can be re-projected on the plane of the road surface or ground plane, wherein the re-projected, calibrated motion vectors particularly are orientated parallel to the longitudinal vehicle axis and have also equal length. The correction factor for compensating the rolling shutter is applied within the cost function to adjust the length of the motion vectors projected on the ground plane and remove the offset caused by the rolling shutter effect.

In a further development, for calibrating the camera, a height calibration of the camera is performed, wherein the height of the camera is determined in dependency on a length of the rotation-compensated motion vector and an expected value of the length of the rotation-compensated motion vector. The height of the camera is a second extrinsic parameter to be calibrated. The height is determined by analysing the rotation-compensated motion vector which is derived from the minimisation of the cost function. This means that a height calibration is performed to find the absolute height of each camera from the ground surface or the relative height between the cameras by analysing the rotation-compensated, calibrated and re-projected motion vectors from the previous step.

The length of the corrected, rotation-calibrated and re-projected motion vector of the camera is proportional to the velocity or speed of the vehicle and inversely proportional to the height of the camera from the ground plane. Therefore, the expected value for the length is advantageously preset in dependency on the velocity of the vehicle. In particular, the velocity of the motor vehicle is determined by means of odometry of the motor vehicle and/or based on at least one further motion vector, which is determined based on images captured by at least one further camera of the motor vehicle. The odometry is the use of data from motion sensors of the motor vehicle, e.g. wheel rotation, steering angle, etc., to estimate a vehicle's change in position over time. Additionally or alternatively, motion vectors from more than one camera can be considered. Therefore, the height of the camera can be determined by adjusting the value of the height of each camera such that the re-projected motion vectors have equal length in all cameras. For this purpose it proves advantageous, if a mean length of the motion vectors of the mirror left and mirror right cameras are taken as a reference and the value of the height of the other cameras is adjusted to match it, since the mirror cameras are affected the least by loading changes of the motor-vehicle.

The invention additionally relates to a computing device for a driver assistance system of a motor vehicle, which is adapted to perform a method according to the invention. The computing device can be integrated into a vehicle-side control unit. The computing device is adapted to compensate for the rolling-shutter effect in images captured by the at least one vehicle-side camera. Furthermore, the computing device is adapted to calibrate the at least one camera, in particular each vehicle-side camera individually, during vehicle motion by means of the images, wherein the images particularly display the texture being present on a road surface of a road for the motor vehicle.

Moreover, the invention additionally relates to a driver assistance system for a motor vehicle comprising at least one camera and a computing device according to the invention. The driver assistance supports a driver of the vehicle by means of the cameras monitoring the environmental region of the vehicle. The driver assistance system can comprise four cameras forming a surround view camera system. The cameras can also comprise fisheye lenses enlarging a detection area of the cameras. The driver assistance system may reliably detect objects in the images captured by the calibrated cameras and thus, may support the driver of the vehicle, for instance by producing a warning signal or automatically braking the motor vehicle when detecting an imminent collision of the motor vehicle with the detected object. In addition, the images captured by the calibrated camera can be displayed, in particular as a video, on a vehicle-side display device. In other words, the camera can be configured as a video camera.

A motor vehicle according to the invention includes a driver assistance system according to the invention. The motor vehicle is in particular configured as a passenger car.

The preferred embodiments presented with respect to the method according to the invention and the advantages thereof correspondingly apply to the computing device, to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are also to be considered as disclosed, in particular by the explanations set out above, which extend beyond or deviate from the feature combinations set out in the relations of the claims.

Now, the invention is explained in more detail based on preferred embodiments as well as with reference to the attached drawings.

Figure 2:
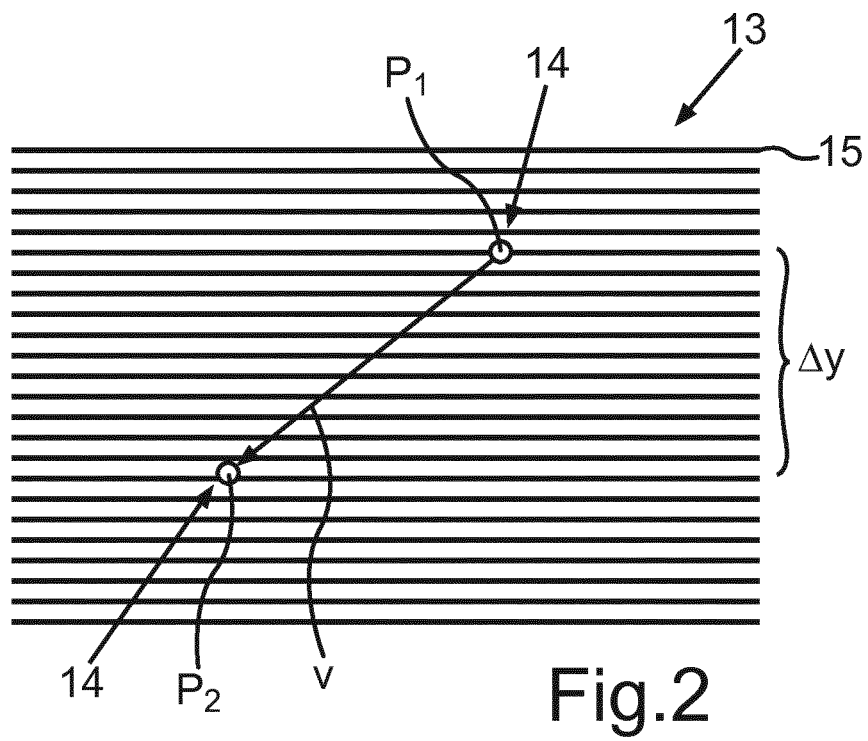

These show in:

FIG. 1 a schematic representation of an embodiment of a motor vehicle according to the invention;

FIG. 2 a schematic representation of motion vectors on a sensor plane; and

Figure 3:
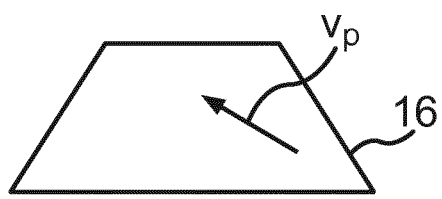

FIG. 3 a schematic representation of motion vectors on a ground plane.

FIG. 1 shows a motor vehicle 1 according to the present invention. In the present case, the motor vehicle 1 is configured as a passenger car. The motor vehicle 1 has a driver assistance system 2 for supporting a driver of the motor vehicle 1. The driver assistance system 2 comprises a computing device 3, which can for example be formed by a vehicle-side control unit. Additionally, the driver assistance system 2 comprises at least one camera 4. In the present case, the driver assistance system 2 includes four cameras 4, wherein a first camera 4 is disposed in a front area 5 of the motor vehicle 1, a second camera 4 is disposed in a rear area 6 of the motor vehicle 1, a third camera 4 is disposed on a driver's side 7 of the motor vehicle 1, in particular on a wing mirror of the driver's side 7, and a fourth camera 4 is disposed on a passenger side 8 of the motor vehicle 1, in particular on a wing mirror of the passenger's side 8. The cameras 4 disposed on the driver's side 7 and the passenger's side 8 can also replace the wing mirrors, whereby the motor vehicle 1 can be designed as a mirrorless vehicle 1 enabling mirrorless driving. By means of the cameras 4, an environmental region 9 of the motor vehicle 1 can be captured in images or rather video frames. The cameras 4 can comprise fisheye lenses in order to enlarge an angle of view and thus a detection range of the cameras 4.

The cameras 4 are adapted to display the three-dimensional environmental region 9 of the motor vehicle 1 in the form of two-dimensional images. Therefore, the cameras 4 can transform the 3D world coordinates X, Y, Z into 2D pixel coordinates based on the knowledge of intrinsic and extrinsic parameters of the camera 4. For instance, such intrinsic parameters are the focal length and the image sensor format of the camera 4. The extrinsic parameters particularly comprise a pose of the camera 4 describing a spatial orientation of the cameras 4 and a height of the cameras 4 given in a roll-pitch-yaw coordinate system X, Y, Z. Since the cameras 4 may change their pose due to load of the vehicle or due to shocks during movement of the motor vehicle 1, the computing device 3 is particularly adapted to perform an extrinsic calibration of each camera 4 individually during motion of the vehicle 1 on a road 10, in particular during an approximately straight motion.

Here, the camera 4 comprises an image sensor which is configured as a CMOS sensor. Thus, the images are captured using a rolling shutter method. This means that each line in the image is exposed at a later time than the previous lines. As the vehicle 1 moves the same point-like feature captured at a particular scan line in one frame may be captured at a different scan line in the next frame due to perspective distortion. This effect can be due to the fact that a sensor plane 13 of the image sensor (see FIG. 2) is typically not parallel to a ground plane 16 (see FIG. 3) located in the plane of the road surface 11 or aligned with the longitudinal axis X of the vehicle 1 and also to a lesser extent due to fisheye distortion.

Therefore the time taken to capture the two instances of the same feature 14, which is represented by the dot in FIG. 2, varies for different features 14 according to the number of sensor lines 15 their trajectories span on the sensor plan 13 of the image sensor. When the vehicle 1 is travelling on a straight path, the feature trajectories between successive frames are linear and can be defined by a two dimensional motion vector v on the sensor plane 13. For example, considering a single feature 14 tracked between two frames under no perspective distortion, its motion vector v is shown in FIG. 2. The motion vector v represents the displacement of the feature 14 on the sensor plane 13 between the two images or frames overlaid on top of each other. In other words the motion vector v describes the change of a first position P1 corresponding to the feature 14 while capturing a first image or frame to a second position P2 corresponding to the feature 14 while capturing a second image or frame. The first position P1 corresponds to a starting point or starting position of the motion vector v and the second position P2 corresponds to an end point or end position of the motion vector v. The motion vector v can be projected on the ground plane 16 using calibration parameters of the camera 4. In FIG. 3 the projected motion vector $v_p$ is shown. For extrinsic calibration of the camera 4, a so-called motion tracking calibration, MTC, can be performed.

The extrinsic calibration of the camera 4 can be performed by means of the images consecutively captured by the camera 4, wherein the images at least partially display a texture of a road surface 11 of the road 10. The texture particularly comprises tarmac. Moreover, it is not necessary that the pictures display strong features, like a kerb 12 alongside the road 10. Within the MTC method, a block matching operation can be performed which matches small rectangular blocks of pixels between the two images.

Reference blocks can be chosen at predefined fixed locations in one image, e.g. the first image, and searched within nominated search regions in the other image, e.g. the second image. The reference blocks can be adjacent or overlapping and their shape can be rectangular, circular or anything else. After identifying two mutually corresponding blocks in the two images, for each pair of corresponding blocks a block motion vector or block displacement vector can be determined describing the displacement of the location of one image area displaying a certain road surface area between the images due to vehicle motion. In other words, the block matching step produces a set of block motion vectors for each camera 4. Since the block motion vectors describe the displacement of the features within the block the block motion vectors can be identical to the motion vectors v.

Typical block matching algorithms can be used such as those used in motion estimation for video-compression. These include but are not limited to the full-search also referred to as exhaustive-search algorithm where all possible locations within the nominated search region are checked and also gradient-descent based methods such as diamond-search or hexagon-based-search. A typical cost function also referred to as block distortion measure can be used such as cross correlation, sum of absolute differences, sum of squared differences or more advanced methods such as sum of absolute transformed differences, rank, census, frequency domain methods and more.

Then, for calibrating the camera 4, a rotation calibration can be performed by finding a 3-DOF spatial orientation of each camera 4 to the road surface 11 by analysing the block motion vectors. The orientation of the cameras 4 can be expressed in the roll-pitch-yaw rotation scheme rotating in sequence about the fixed X, Y and Z axes of the world coordinate system, where X is the longitudinal vehicle axis, Y is the transverse vehicle axis and Z is the vertical vehicle axis as shown in FIG. 1.

A cost function to be minimised is formulated that exploits the geometric properties of the block motion vectors on the ground plane 11, in particular considering the constraint for approximately straight driving of the motor vehicle 1. While driving straight on flat ground, a calibrated system should produce motion vectors $v_p$ projected onto the ground plane 16 (see FIG. 3) free from perspective distortion, thus, motion vectors $v_p$ that are all parallel to the longitudinal X-axis and of equal length.

By minimising the cost function the calibration is adjusted in such a way that the projected motion vectors $v_p$ on the ground plane 16 are parallel to the longitudinal vehicle axis X and have also equal length. The latter condition holds true only, if all motion vectors $v_p$ represent the motion of features 14 in the same period of time, i.e. only when all the sensor lines 15 or scan lines of the sensor have been exposed simultaneously. Otherwise this interval varies for each motion vector v depending on the number of scan lines 15 spanned by its endpoints at the positions P1, P2 on the sensor plane 13. If the end position, here position P2, is lower than the start position, here position P1, then additional time has elapsed in comparison to the nominal frame period. If the end position P2 is higher than the start position P1 then less time has elapsed in comparison to the nominal frame period. These offsets affect the true projected length of the motion vectors $v_p$ on the ground plane 16 and cause error in the calibration, in particular in the rotation calibration, when not taken into account. Thus, for each motion vector v, a correction factor k can be defined that removes the offsets as follows:

$$k = 1 - \frac{\Delta y}{H + h}.$$

$\Delta y$ is a vertical span of the motion vector v in sensor lines 15, H is the total number of sensor lines 15 and h is an additional number of lines 15 consumed internally by the sensor as the 'blanking period'. This factor k is applied within the calibration cost function to adjust the length of the block motion vectors projected on the ground plane 16 and remove the offset introduced by the inconsistent timing. In particular, this correction is applicable under the assumption of straight vehicle motion, constant vehicle speed and no perspective distortion i.e. known extrinsic calibration. The latter requirement may seem contradictory but in practice it is fully satisfied as the calibration converges by minimising the cost function.

The sign of the vertical span $\Delta y$ depends on the relative position P1, P2 between the endpoints of the motion vectors v as explained previously resulting in a correction factor greater, less or equal to unity. A factor greater than unity means the motion vector v has been captured in less time than the nominal frame period, so it must be extended. A factor less than unity means that the motion vector v has been captured in more time than the nominal frame period, so it must be shortened. A unit factor means that no adjustment is required i.e. the motion vector v is on the same scan line 15.

The invention claimed is:

1. A method for detecting a rolling shutter effect in images of an environmental region of a motor vehicle captured by an image sensor of at least one camera of the motor vehicle comprising a plurality of sensor lines, the method comprising:
   a) determining a first position on a sensor plane of the image sensor corresponding to a feature when capturing a first image and identifying a second position on the sensor plane corresponding to the feature when capturing a second image;

b) determining a motion vector characterizing a displacement of the feature on the sensor plane between the first position and the second position;

c) determining a vertical span of the motion vector characterizing a number of sensor lines at least partially covered by the motion vector; and d) detecting the rolling shutter effect based on the vertical span wherein a correction factor for compensating the rolling shutter effect is determined dependent on the vertical span of the motion vector, the correction factor is determined dependent on a total number of sensor lines, wherein the total number of sensor lines comprises a number of active sensor lines and a number of vertical blanking lines and an extrinsic calibration of the camera is performed based on the motion vector and on the correction factor, wherein for performing the extrinsic calibration, a rotation calibration of the camera is performed, wherein a cost function describing a deviation between the motion vector and a predetermined vector is determined in dependency on the correction factor and a rotation-compensated motion vector is determined by minimizing the cost function.

2. A computing device for a driver assistance system of a motor vehicle, which is adapted to perform a method according to claim 1.

3. A driver assistance system for a motor vehicle comprising: at least one camera; and a computing device according to claim 2.

4. A motor vehicle with a driver assistance system according to claim 3.

5. A method for detecting a rolling shutter effect in images of an environmental region of a motor vehicle captured by an image sensor of at least one camera of the motor vehicle comprising a plurality of sensor lines, the method comprising:

a) determining a first position on a sensor plane of the image sensor corresponding to a feature when capturing a first image and identifying a second position on the sensor plane corresponding to the feature when capturing a second image;

b) determining a motion vector characterizing a displacement of the feature on the sensor plane between the first position and the second position;

c) determining a vertical span of the motion vector characterizing a number of sensor lines at least partially covered by the motion vector; and d) detecting the rolling shutter effect based on the vertical span wherein a correction factor for compensating the rolling shutter effect is determined dependent on the vertical span of the motion vector, the correction factor is determined dependent on a total number of sensor lines, wherein the total number of sensor lines comprises a number of active sensor lines and a number of vertical blanking lines and an extrinsic calibration of the camera is performed based on the motion vector and on the correction factor, wherein for performing the extrinsic calibration, a rotation calibration of the camera is performed, wherein a cost function describing a deviation between the motion vector and a predetermined vector is determined in dependency on the correction factor and a rotation-compensated motion vector is determined by minimizing the cost function, and wherein for performing the extrinsic calibration, a height calibration of the camera is performed, wherein the height of the camera is determined in dependency on a length of the rotation-compensated motion vector and an expected value of the length of the rotation-compensated motion vector.

6. A method for detecting a rolling shutter effect in images of an environmental region of a motor vehicle captured by an image sensor of at least one camera of the motor vehicle comprising a plurality of sensor lines, the method comprising:

a) determining a first position on a sensor plane of the image sensor corresponding to a feature when capturing a first image and identifying a second position on the sensor plane corresponding to the feature when capturing a second image;

b) determining a motion vector characterizing a displacement of the feature on the sensor plane between the first position and the second position;

c) determining a vertical span of the motion vector characterizing a number of sensor lines at least partially covered by the motion vector; and d) detecting the rolling shutter effect based on the vertical span wherein a correction factor for compensating the rolling shutter effect is determined dependent on the vertical span of the motion vector, the correction factor is determined dependent on a total number of sensor lines, wherein the total number of sensor lines comprises a number of active sensor lines and a number of vertical blanking lines and an extrinsic calibration of the camera is performed based on the motion vector and on the correction factor, wherein for performing the extrinsic calibration, a rotation calibration of the camera is performed, wherein a cost function describing a deviation between the motion vector and a predetermined vector is determined in dependency on the correction factor and a rotation-compensated motion vector is determined by minimizing the cost function, wherein for performing the extrinsic calibration, a height calibration of the camera is performed, wherein the height of the camera is determined in dependency on a length of the rotation-compensated motion vector and an expected value of the length of the rotation-compensated motion vector, and wherein the expected value for the length is preset in dependency on a velocity of the motor vehicle.

7. The method according to claim 6, wherein the velocity of the motor vehicle is determined by means of odometry and/or based on at least one further motion vector determined for at least one further camera.

* * * * *